United States Patent
Lukanc et al.

(10) Patent No.: US 9,977,519 B2
(45) Date of Patent: May 22, 2018

(54) ACTIVE PEN WITH BIDIRECTIONAL COMMUNICATION

(71) Applicant: Synaptics Incorporated, San Jose, CA (US)

(72) Inventors: Jeff Lukanc, San Jose, CA (US); Kirk Hargreaves, San Jose, CA (US); David Sobel, San Jose, CA (US); Joseph Kurth Reynolds, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 148 days.

(21) Appl. No.: 15/047,773

(22) Filed: Feb. 19, 2016

(65) Prior Publication Data

US 2016/0246390 A1 Aug. 25, 2016

Related U.S. Application Data

(60) Provisional application No. 62/120,856, filed on Feb. 25, 2015, provisional application No. 62/207,249, filed on Aug. 19, 2015.

(51) Int. Cl.
G06F 3/0354 (2013.01)
G06F 3/041 (2006.01)
G06F 3/038 (2013.01)
G06F 3/044 (2006.01)

(52) U.S. Cl.
CPC ............ *G06F 3/0383* (2013.01); *G06F 3/038* (2013.01); *G06F 3/03545* (2013.01); *G06F 3/0416* (2013.01); *G06F 3/044* (2013.01); *G06F 3/0412* (2013.01); *G06F 2203/0384* (2013.01)

(58) Field of Classification Search
CPC .... G06F 3/0383; G06F 3/03545; G06F 3/038; G06F 3/0416; G06F 2203/0384; G06F 2203/04104; G06F 2203/04105; G06F 2203/04108; G06F 3/0414; G06F 3/0412; G06F 3/0425; G06F 3/044
See application file for complete search history.

(56) References Cited

U.S. PATENT DOCUMENTS

| | | | | |
|---|---|---|---|---|
| 5,581,783 A * | 12/1996 | Ohashi | ............... | G06F 3/03545 345/501 |
| 7,110,576 B2 * | 9/2006 | Norris, Jr. | ........ | G07B 17/00435 178/19.01 |
| 9,411,440 B2 * | 8/2016 | Avanzi | ............... | G06F 3/03545 |
| 2007/0046649 A1 * | 3/2007 | Reiner | ............... | G06F 3/03545 345/173 |
| 2007/0291007 A1 * | 12/2007 | Forlines | ............... | G06F 3/0488 345/173 |

(Continued)

*Primary Examiner* — Julie Anne Watko
(74) *Attorney, Agent, or Firm* — FBFK PC

(57) ABSTRACT

A processing system for an input device, the processing system including: a sensor module coupled to sensor circuitry and configured to: initiate a current beacon period including a plurality of timeslots by broadcasting a current beacon signal to a plurality of active pens; receive, during a first timeslot, a first downstream packet from a first active pen transceiver; and receive, during a second timeslot, a second downstream packet from a second active pen transceiver; and a determination module configured to: determine an attribute of a first active pen including the first active pen transceiver from at least the first downstream packet.

24 Claims, 7 Drawing Sheets

(56) References Cited

U.S. PATENT DOCUMENTS

| | | | |
|---|---|---|---|
| 2012/0013555 A1* | 1/2012 | Maeda | G06F 3/03545 345/173 |
| 2012/0274583 A1* | 11/2012 | Haggerty | G06F 3/0488 345/173 |
| 2016/0077616 A1* | 3/2016 | Durojaiye | G06F 3/03545 345/173 |
| 2017/0060274 A1* | 3/2017 | Watanabe | G06F 3/03545 |
| 2017/0097695 A1* | 4/2017 | Ribeiro | G06F 3/0383 |

* cited by examiner

ACTIVE PEN WITH BIDIRECTIONAL COMMUNICATION

CROSS-REFERENCE TO RELATED APPLICATIONS

This application is a non-provisional application of U.S. Provisional Patent Application Ser. No. 62/120,856, filed on Feb. 25, 2015. This application is also a non-provisional application of U.S. Provisional Patent Application Ser. No. 62/207,249, filed on Aug. 19, 2015. Accordingly, this application claims priority to both U.S. Provisional Patent Application Ser. No. 62/120,856 and U.S. Provisional Patent Application Ser. No. 62/207,249 under 35 U.S.C. § 119(e). U.S. Provisional Patent Application Ser. Nos. 62/120,856 and 62/207,249 are hereby incorporated by reference in their entirety.

TECHNICAL FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Proximity sensor devices may be used to detect styli or pens.

SUMMARY

In general, in one aspect, embodiments of the invention relate to a processing system for an input device. The processing system comprises: a sensor module coupled to sensor circuitry and configured to: initiate a current beacon period comprising a plurality of timeslots by broadcasting a current beacon signal to a plurality of active pens; receive, during a first timeslot, a first downstream packet from a first active pen transceiver; and receive, during a second timeslot, a second downstream packet from a second active pen transceiver; and a determination module configured to: determine an attribute of a first active pen comprising the first active pen transceiver from at least the first downstream packet.

In general, in one aspect, embodiments of the invention relate to a method for operating a processing system of an input device. The method comprises: initiating a current beacon period comprising a plurality of timeslots by broadcasting a current beacon signal to a plurality of active pens; receiving, during a first timeslot, a first downstream packet from a first active pen transceiver over a first frequency; receiving, during a second timeslot, a second downstream packet from a second active pen transceiver over a second frequency; and determining an attribute of a first active pen comprising the first active pen transceiver from at least the first downstream packet.

In general, in one aspect, the invention relates to an active pen. The active pen comprises: an identification (ID) register storing a pen identification (ID); one or more buttons; and a transceiver configured to: receive, from a first input device, a current beacon signal comprising an upstream packet specifying the pen ID, a timeslot, and a frequency, wherein the current beacon signal initiates a current beacon period comprising a plurality of timeslots; transmit, to the first input device and during the timeslot specified in the upstream packet, a downstream packet comprising a status of the button using the frequency specified in the upstream packet.

Other aspects of the invention will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that may facilitate improved usability along with various other benefits.

Figure 1:
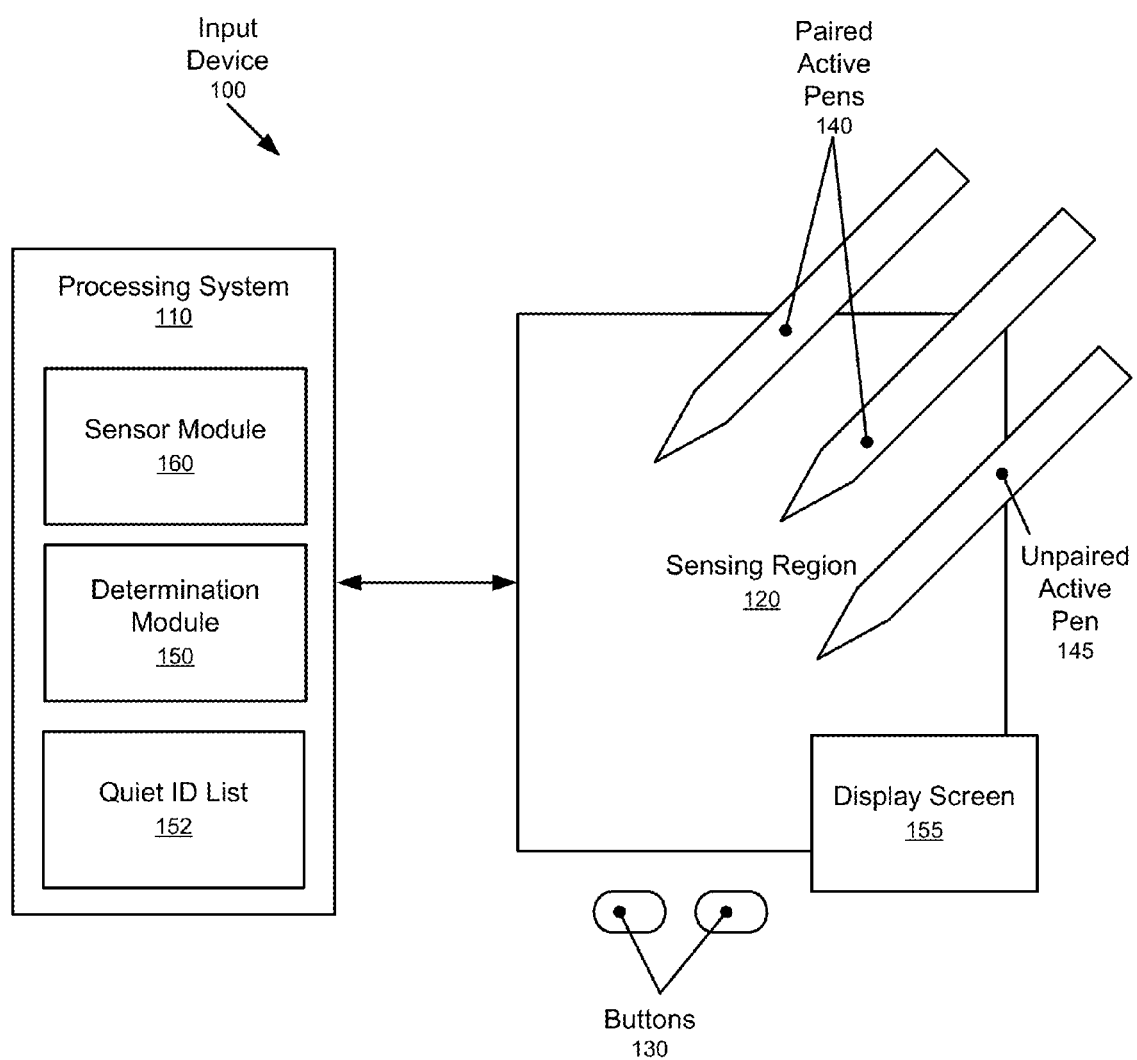
FIG. 1 shows a block diagram of an input device in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsing capable devices, e-book readers, smart phones, and personal digital assistants (PDAs). Additional example electronic systems include composite input devices, such as physical keyboards that include input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) can be implemented as a physical part of the electronic system, or can be physically separate from the electronic system. As appropriate, the input device (100) may communicate with parts of the electronic system using any one or more of the following: buses, networks, and other wired or wireless interconnections. Examples include I²C, SPI, PS/2, Universal Serial Bus (USB), MIPI D-PHY, MIPI I3C, Bluetooth, RF, a capacitive communication method, and IRDA.

In FIG. 1, the input device (100) is shown as a proximity sensor device (also often referred to as a "touchpad" or a "touch sensor device") configured to sense input provided by one or more input objects in a sensing region (120). Example input objects include fingers and styli (also known as pens), as shown in FIG. 1. Input objects may include passive pens (not shown) and active pens (e.g., paired active pens (140), unpaired active pen (145)). Active pens (140, 145) typically include a transmitter that is driven by a power source in the pen in contrast to passive pens which are detected by the proximity sensor device without having an active transmitter on the pen. A transmitter may provide a means for identification of the position of the active pen, reception of data (e.g., configuration data, time slot information, frequency information, etc.) and sending data (e.g., pressure, color, or button status information)

Sensing region (120) encompasses any space above, around, in and/or near the input device 100 in which the input device (100) is able to detect user input (e.g., user input provided by one or more input objects (140, 145)). The sizes, shapes, and locations of particular sensing regions may vary widely from embodiment to embodiment. In some embodiments, the sensing region (120) extends from a surface of the input device (100) in one or more directions into space until signal-to-noise ratios prevent sufficiently accurate object detection. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) comprises one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to the receiver sensor electrodes. For example, the transmitter sensor electrodes may be modulated relative to a reference voltage to transmit transmitter signals and the receiver sensor electrodes may be held substantially constant relative to the reference voltage to facilitate receipt of resulting signals. The reference voltage may be a substantially constant voltage or a varying voltage. In various embodiments, the reference voltage may be system ground. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system (110) is shown as part of the input device (100). The processing system (110) is configured to operate the hardware of the input device (100) to detect input in the sensing region (120). The processing system (110) comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system (110) also comprises electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a computing device, and the processing system (110) may comprise software configured to run on a central processing unit of the computing device and one or more ICs (perhaps with associated firmware) separate from the central processing unit. As another example, the input device (100) may be physically integrated in a mobile device, and the processing system (110) may comprise circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may comprise circuitry that is a part of the processing system (110), firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, one or more modules may be comprised in separate integrated circuit. For example, a first module may be comprised within a first integrated circuit and a separate module may be comprised within a second integrated circuit. Further, a single module may be comprised within multiple integrated circuits.

In some embodiments, the processing system (110) responds to user input (or lack of user input) in the sensing region (120) directly by causing one or more actions. Example actions include changing operation modes, as well as GUI actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning.

As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen (155). For example, the input device 100 may comprise substantially transparent sensor electrodes overlaying the display screen (155) and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. In various embodiments, the input device 100 may comprise one or more sensor electrodes configured for both display updating and input sensing. In some embodiments, the described active pen may be used with an opaque surface rather than a display. Further, the surface which the active pen interacts with in the sensing region may be a fixed surface or a curved and/or flexible surface. As another example, the display screen may be operated in part or in total by the processing system 110. In some embodiments, sensing input objects capacitively may be synchronized to display updates or a portion of display updates.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In one or more embodiments, data is wirelessly transmitted by an active pen (140, 145) to the processing system (110). This transmitted data may specify one or more attributes of the active pen (140, 145). For example, the data may specify a measured pressure or force at the tip of the active pen (140, 145). As another example, the data may specify the button status (e.g., pressed, not pressed, etc.) of each button of the active pen (140, 145). As another example, the data may specify the tilt of the pen and/or the acceleration of the pen. As yet another example, the data may specify a mode (e.g., erasure mode) in which the active pen (140, 145) is operating.

In one or more embodiments, the transmitted data may include a unique ID (e.g., serial number), a vendor part number, a version ID, or any value that may be set by the manufacturer of the active pen (140, 145). In one or more embodiments, the transmitted data includes the operating condition(s) of the active pen (140, 145) including, for example, the battery level, a low-battery level warning, or other error messages.

In one or more embodiments, the transmitted data includes messages associated with a communications protocol. Example messages include "ACK" messages indicating proper reception by the active pen (140, 145) of an incoming message and "REJECT" messages indicating a refusal of the active pen (140, 145) to accept an incoming message In one or more embodiments, the active pen (140, 145) transmits miscellaneous sensor data. For example, the active pen (140, 145) may be embedded with a fingerprint sensor (e.g., for user authentication of signatures), and the transmitted data may include data associated with the fingerprint sensor. Those skilled in the art, having the benefit of this detailed description, will appreciate that the transmitted data may include various sorts of data that is not traditionally assorted with handwriting and electronic pens.

This data may be transmitted from the active pen (140, 145) to the processing system (110) in one or more downstream packets (discussed below). These attributes may be specified within fields of the downstream packets. The processing system (110) may determine the attributes of the active pens (140, 145) based on the received downstream packets. These determined attributes may impact the manner in which positional information is processed and/or reported to a host. These determined attributes may also trigger various actions (discussed above) to occur. Attributes may also include a pen color that is currently associated with the active pen (140) and should be displayed when drawing input from the active pen on the display screen (155). Attributes can also specify a pen tip that is used in a similar manner as pen color to affect how input from the active pen (140) is displayed on display screen (155). For example, one pen tip might be similar to highlighter and result in a thick line being drawn, while another pen tip might be similar to a pencil and result in a thin line being drawn. Further, the pen tip may affect how much of an effect tilting the active pen has on the resulting displayed drawing. Attribute data may also include data not apparent to the user such as a user ID that is constant for a period of time. Many attributes that may be transmitted downstream from the active pen (140) to the processing system (110) may also be transmitted upstream from the processing system to the active pen (140). For example, ink color may be selectable via a button on the active pen, or by a selection via the sensing region of a smartphone. It may be beneficial to communicate the current color state to both devices regardless of where the selection was made.

In one or more embodiments of the invention, active pens are classified as paired active pens (140) or unpaired active pens (145). Each paired active pen (140) is assigned a unique pen identification (ID). Each unpaired active pen (145) has not been assigned a pen ID and/or is set to a default pen ID (e.g., pen ID=0). An active pen that is currently classified as a paired active pen may become an unpaired active pen at a future point. Similarly, an active pen that is currently classified as an unpaired active pen may become a paired active pen at a future point. In one or more embodiments of the invention, an active pen must be paired before it can transmit downstream packets to the processing system (110).

In one or more embodiments of the invention, data is exchanged between the processing system (110) and the active pens (140, 145) within the context of a repeated beacon period. The sensor module (160) is configured to initiate a beacon period by broadcasting a beacon signal (i.e., a single wideband communication packet). For example, the beacon signal may use the Code division multiple access (CDMA) direct-sequence spread spectrum (DSSS) format with a 64-chip spreading code and 1 MHz chip rate (0-500 kHz bandwidth). As another example, communication may be accomplished via a 31-chip spread code and/or a 3-bit Barker code preamble. Moreover, each beacon signal may last approximately 1.28 ms and have an amplitude in in excess of 3V. Of course, beacon signal duration may vary according to the specific configuration selected.

In one or more embodiments, the beacon signal provides a timing reference to all active pens (140, 145). A predetermined number of timeslots (e.g., 16, 32, 64, etc.) follow the beacon signal and are referenced from the end of the beacon signal. Each timeslot may be of the same duration (e.g., 0.25 ms, 0.5 ms, 1 ms, etc.). Additionally or alternatively, different timeslots may be of different durations. It is during these timeslots that the paired active pens (140) transmit their downstream packets. Each downstream packet may be, for example, 21-bits in length (1 start bit, 16-bits of data, 4-bits cyclic redundancy check (CRC)). In one or more embodiments, a single downstream packet is transmitted over multiple (e.g., 2, 4, 8, etc.) concatenated timeslots.

In one or more embodiments, different active pens transmit their downstream packets during different timeslots. Additionally or alternatively, multiple active pens transmit their downstream packets during the same timeslot(s), but with each active pen using a carrier signal having a different frequency. Additionally or alternatively, the multiple active pens transmit their downstream packets during the same timeslot(s), but with each active pen using a different, orthogonal coding sequence (e.g., CDMA) to modulate the pen signal transmission. In one or more embodiments, each active pen transmits its downstream packet by modulating (e.g., using on-off keying (OOK), binary phase-shift keying (BPSK), etc.) a carrier signal with the content of the downstream packet. In one or more embodiments, a single frequency (e.g., 60 Hz, 120 Hz, 180 Hz, etc.) pilot tone (for position and synchronization) is transmitted by the active pen before transmitting its downstream packet. The downstream packets may be received (e.g., demodulated) by the sensor module (160). The determination module (150) may parse these downstream packets to determine the one or more attributes of the active pens (140, 145).

Figure 3:
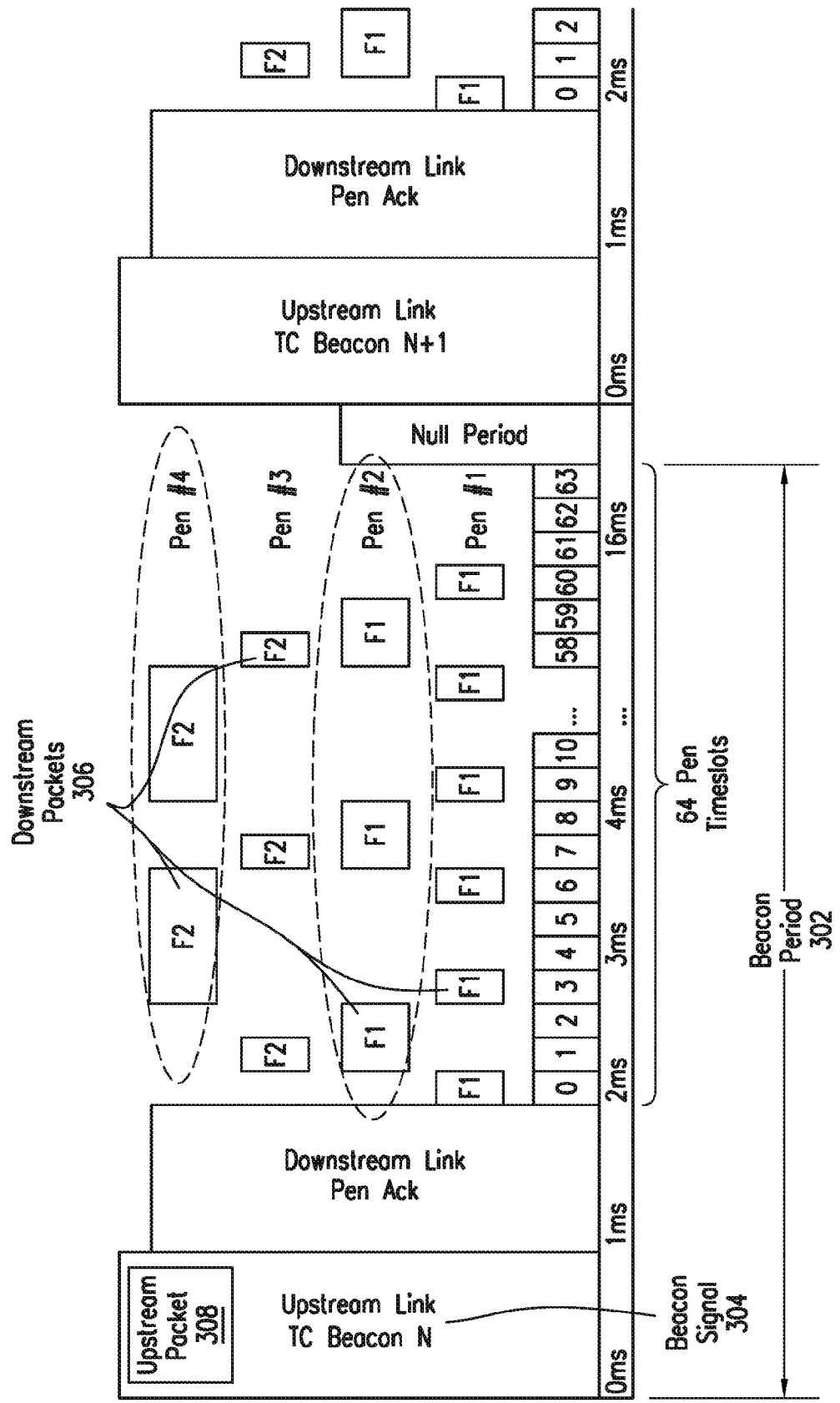
FIG. 3 and FIG. 4 show timing charts in accordance with one or more embodiments of the invention.

FIG. 3 shows a timing diagram in accordance with one or more embodiments. Specifically, FIG. 3 shows a beacon period (302). The beacon period (302) starts with a beacon signal (304). Multiple timeslots follow the beacon signal (304). It is during these timeslots that the paired active pens (e.g., Pen #1, Pen #2, Pen #3, Pen #4) transmit their downstream packets (306). As shown in FIG. 3, there are multiple timeslots wherein both Pen #1 and Pen #4 are transmitting their downstream packets (306). However, Pen #1 is using a carrier signal with a frequency of F1, while Pen #4 is using a carrier signal with a frequency of F2. As also shown in FIG. 3, Pen #1 and Pen #2 each use a carrier signal having the same frequency (i.e., F1). However, Pen #1 and Pen #2 transmit their downstream packets (306) during different timeslots. The beacon period (302) may be repeated multiple times.

In one or more embodiments, the beacon signal (304) includes an upstream packet (308). The upstream packet (308) may target one of the active pens by specifying a pen ID. In one or more embodiments, only the active pen with the matching pen ID utilizes the upstream packet (308). In other words, the upstream packet (308) may be discarded/ignored by active pens that do not have the matching ID. The upstream packet (308) may specify one or more timeslots and one or more frequencies. The upstream packet (308) may also specifying downstream packet size, number of downstream packets, downstream packet rates, etc. Upon receiving the upstream packet (308), the active pen may reconfigure itself to transmit its downstream packets during the timeslot(s) and at the frequency/frequencies specified in the upstream packet (308).

Those skilled in the art, having the benefit of this detailed description, will appreciate that the processing system (110) may use the upstream packet (308) to dynamically configure and reconfigure one or more of the active pens. In one or more embodiments, the need to reconfigure arises when noise is detected at one of the carrier signal frequencies. A new carrier signal frequency may be selected in order to mitigate noise.

As discussed above, the beacon signal (304) is received by all active pens, including unpaired active pens. An unpaired active pen may listen for the beacon signal (304) with a programmable on/off duty cycle. In some embodiments, an on/off duty cycle may be utilized to reduce the power consumption of an active pen. In one or more embodiments of the invention, an unpaired active pen responds to the beacon signal (304) with an acknowledgement (ACK). The ACK may be transmitted on a default frequency in the timeslot immediately following the beacon signal (304). Other timeslots may be used as well. In some embodiments, the ACK frequency is variable. It may also be set by the uplink beacon.

In one or more embodiments, the upstream packet (308) is used to pair an unpaired active pen (e.g., unpaired active pen (145)) following the receipt of the ACK. In such embodiments, the upstream packet (308) may include the default pen ID (i.e., pen ID=0), a new pen ID to be assigned to the unpaired active pen, and one or more timeslots and carrier signal frequencies to be used by the unpaired active pen to transmit its downstream packets. Once the unpaired active pen is assigned a (non-zero) pen ID, timeslots, and carrier signal frequencies, the unpaired active pen is now classified as a paired active pen. This is illustrated in FIG. 4 (discussed below).

Figure 4:
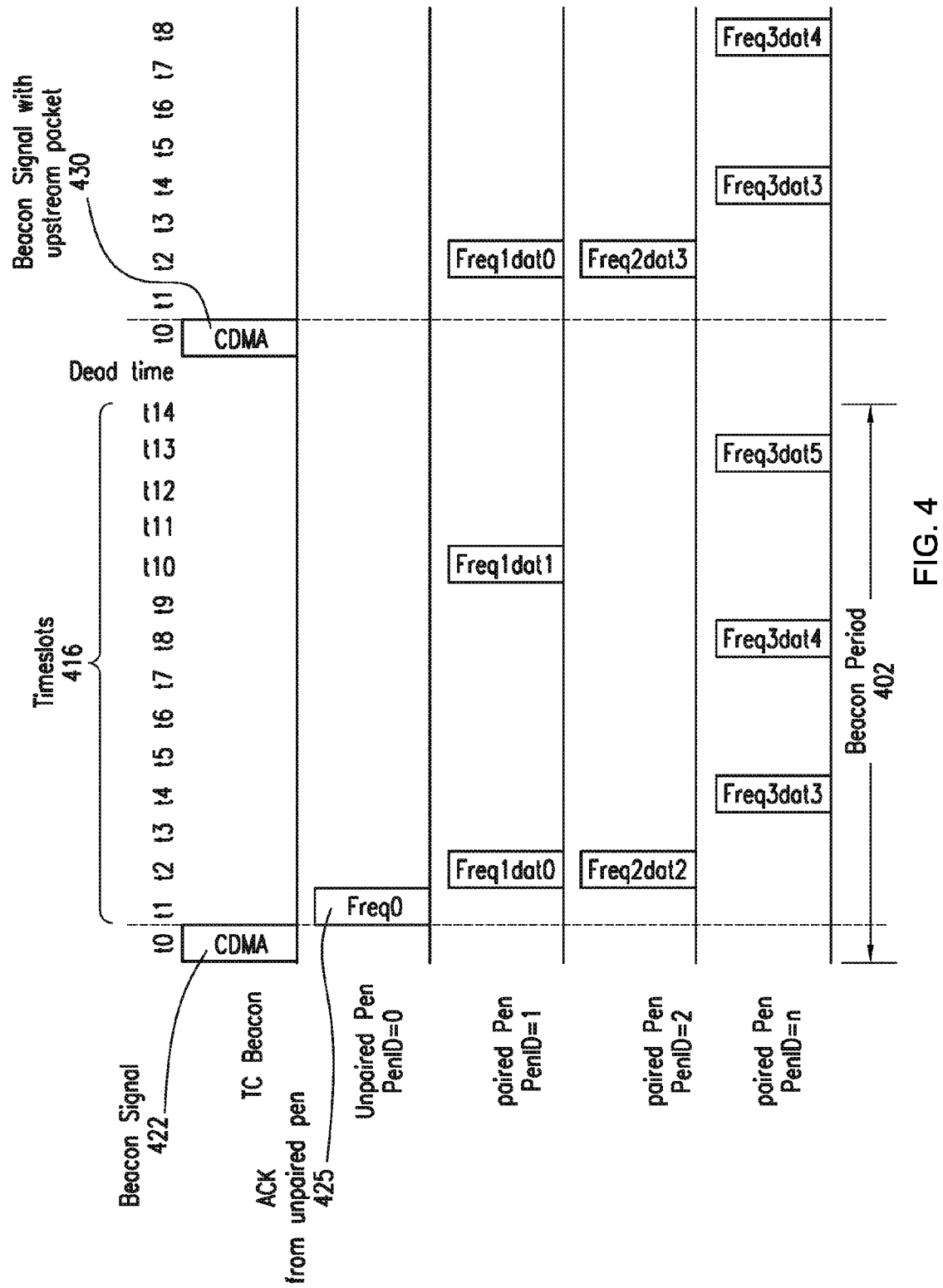

FIG. 4 shows a timing diagram in accordance with one or more embodiments. As shown in FIG. 4, there is a beacon period (402) that starts with an initial beacon signal (422) followed by multiple timeslots (i.e., t1, t2, . . . , t14) (416). In the timeslot immediately following the beacon signal (i.e., t1), the processing system (110) receives an ACK (425) from the unpaired active pen in response to the initial beacon signal (422). Then, in the subsequent beacon period, the beacon signal (430) includes an upstream packet with the new pen ID to be assigned to the unpaired active pen, timeslots, and carrier frequencies for the now paired active pen to transmit its downstream packets. In some embodiments, the beacon may also request the pen to transmit in the current beacon period. That is, the pen need not wait until the next beacon period.

Referring back to FIG. 1, in one or more embodiments of the invention, the processing system (110) includes a quiet ID list (152). The quiet ID list (152) may be implemented in hardware, software, firmware, or any combination thereof. As discussed above, the processing system (110) is expecting downstream packets from various paired active pens at different timeslots. In one or more embodiments of the invention, if the determination module (150) detects one or more missing downstream packets over one or more beacon periods for a paired active pen, the determination module (150) assumes the paired active pen is no longer in range. The determination module (150) then adds the pen ID of the paired active pen to the quiet ID list (152). Moreover, when it is time to assign a new pen ID to an unpaired active pen, the determination module (150) may select the oldest pen ID in the quiet ID list (152) for use as the new pen ID. Although FIG. 1 discloses a list, other data structures may also be used.

Figure 2:
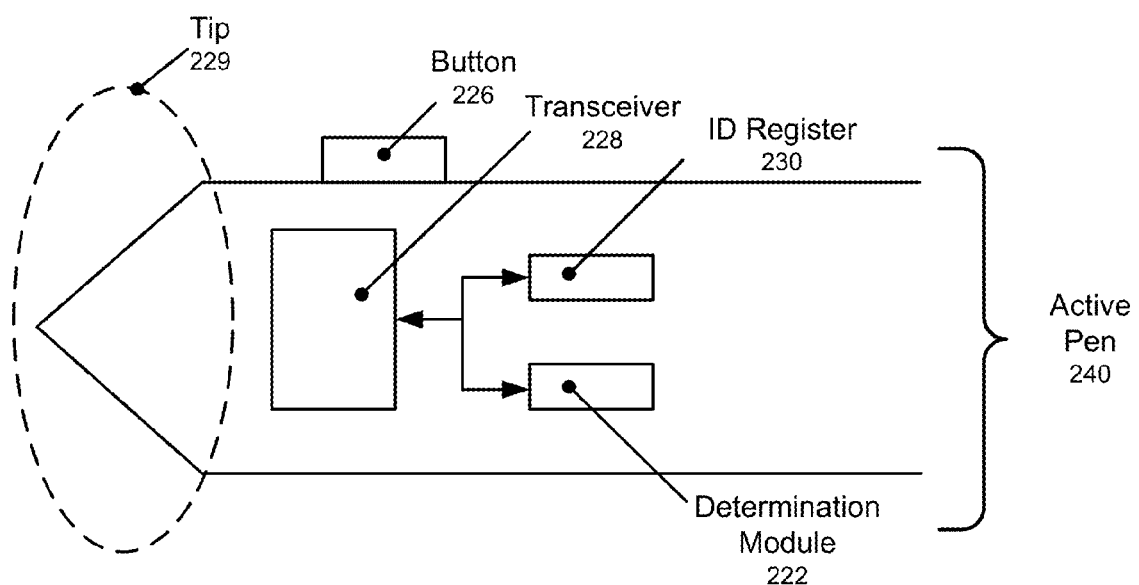
FIG. 2 shows a block diagram of an active pen in accordance with one or more embodiments of the invention.

FIG. 2 shows a block diagram of an active pen (240) in accordance with one or more embodiments of the invention. The active pen (240) may be essentially the same as the active pens (140, 145) discussed above in reference to FIG. 1. As shown in FIG. 2, the active pen (240) includes a tip (229), a button (226), a transceiver (228), an ID register (230), and a determination module (222). Moreover, the active pen (240) may have additional sensors (e.g., force sensor, accelerometer, barrel-grip sensor, fingerprint sensor, battery status sensor, etc.) (not shown). As discussed above, the status of each button (226), the measured pressure or force against the tip (229), the acceleration of the active pen (240), etc. are all potential attributes that may be encoded in a downstream packet and transmitted to the processing system (110).

In one or more embodiments, the active pen (240) includes the transceiver (228). The transceiver (228) is configured to receive the broadcast beacon signal. The transceiver (228) is also configured to transmit the downstream packets of the active pen (240) during the assigned timeslots and using the assigned carrier signal frequencies. Although FIG. 2 shows only one transceiver (228), the active pen (240) may have multiple transceivers (not shown). Each of the multiple transceivers (not shown) may transmit downstream packets. Moreover, one of the active pen's attributes (e.g., pen tilt, etc.) may be determined by the processing system (110) based on the relative strengths of the signals from the multiple transceivers and/or the multiple downstream packets from different transceivers.

In one or more embodiments, the second transceiver (not shown) transmits a pilot tone that is the same or different from the first transceiver (228), using a timeslot that is the same or different than the timeslot used by the first transceiver (228). In such embodiments, both transceivers are configured by the host via the beacon signal using the same pen ID. If the first transmitter (228) is detected by the processing system at a first position (e.g., x1, y1), the second transmitter is detected by the processing system (110) at a second position (x2, y2), and the distance between the first and second transmitters is known, then the tilt angle could be determined by the processing system (110).

While FIG. 2 illustrates an active pen with a single transceiver, it should be appreciated that active pens, or other input objects, with multiple transceivers/transmitters may also be used. Multiple transceivers may be paired with the processing system (110) concurrently. This may be useful in a variety of circumstances. For example, having multiple transceivers in an active pen may allow the processing system to determine the tilt of an active pen. The processing system may detect the location of both transceivers in the sensing region. Depending on their placement on the active pen, the distance between horizontal distance, as observed in the sensing region, will vary with the tilt of the pen. This will occur if one transceiver is placed at the tip of the pen and a second transceiver is disposed further up the body of the pen. By determining the location of each transceiver in the sensing region, the processing system can determine the approximate angle of tilt of then pen. This enables the processing system to determine X-Y position and angle on a flat surface. In a 3D or curved sensing region, the processing system may determine position and tilt. Other devices may also benefit from multiple transceivers. For example, multiple transceivers may allow a user to specific a line in the sensing region allowing indication of a straight line similar to common use of a physical ruler for drawing straight lines.

In one or more embodiments of the invention, the active pen (240) includes the ID register (230). The ID register (230) stores the pen ID of the active pen (240) as assigned by the processing system (110) (e.g., assigned by the upstream packet (308)). In one or more embodiment, if the active pen (240) is unpaired, the pen ID=0. In contrast, if the active pen (240) is paired, the pen ID≠0. Those skill in the art, having the benefit of this detailed description, will appreciate that as the active pen (240) moves away from the input device (100), it is increasingly likely that the active pen (240) will be out of range of the beacon signal. In one or more embodiments, the active pen (240) includes the determination module (222). The determination module (222) detects a missing (i.e., not received) signal beacon. If one or more missing signal beacons are detected, the determination module (222) may un-pair the active pen (240) by setting the ID register to zero.

Referring back to FIG. 1, although the detailed description has focused on the active pens (140, 145) transmitting downstream packets to the processing system (110), in one or more embodiments, data is transmitted from the processing system (110) to one or more active pens (140, 145). In other words, transmission of the downstream packets may be temporarily halted, and the active pens (140, 145) enter a special receive mode for one or more beacon periods. While in receive mode, the sensor module (160) may transmit new or updated firmware data for installation on the active pens (140, 145) via upstream data packets. In this manner, rather than transmitting physical attributes such as color, the processing system (110) may transmit updated firmware to the active pen via one or more upstream data packets. In one embodiment, the active pen may immediately install the updated firmware after completing reception of the firmware data. In other embodiments, the active pen may delay installation of the firmware so as to not interfere with standard operation or risk installation failure. For example, the active pen may wait until it has been unpaired for a period of time, it is above a battery threshold, and/or until its battery is connected to a power source to initiate installation. After installation of updated firmware, the active pen may resume standard operation and attempt to pair upon detecting a beacon signal. Those skilled in the art, having the benefit of this detailed description, will appreciate that the firmware executing on the active pens (140, 145) controls various operations of the active pens (140, 145).

In one or more embodiments of the invention, multiple unpaired active pens exist within the range of the processing system (110). In other words, the multiple unpaired active pens may receive the beacon signal broadcasted by the sensor module (160). A collision may exist if two (or more) unpaired active pens attempt to pair with the processing system (110) at the same time (i.e., each of the unpaired active pens sends an ACK) in response to a beacon signal. In one or more embodiments, the determination module (150) is configured to detect a collision between the multiple active pens. Moreover, the determination module (150) may generate a collision packet that is sent by the sensor module (160) to the multiple unpaired active pens. In some embodiments, the collision packet may be sent to all pens, as it may be unknown how many pens are paired and unpaired, and whether each pen believes it is paired. In response to receiving the collection packets, each of the unpaired active pens may wait a random time interval (e.g., a random number of beacon periods) before re-attempting to pair with the processing system (110). In other words, the unpaired active pens might not send any acknowledgement to any received beacon signal during the random time interval.

In one or more embodiments of the invention, there may be a collision between two or more paired active pens (140). Collisions may be detected by noting that responses are being received at the same timeslot and frequency, but at different locations (either in X or Y or both). In this case, the sensor module may broadcast a collision packet to these paired active pens. In response, the active pens would un-pair, wait for a random number of sensor beacons, and try and re-establish communication.

In one or more embodiments of the invention, each user of an active pen (140, 145) is associated with a user ID (e.g., an alphanumeric value). The user ID may be hardcoded into the active pen of the user. Additionally or alternatively, the user may input the user ID into the processing system (110). For example, entering the user ID may be part of a login procedure for an application. The processing system (110) may transmit the user ID to the active pen operated by the user (e.g., in the upstream packet (308), discussed above in reference to FIG. 3). The user ID may be transmitted by the active pen during subsequent pairings with the processing system (110) or the processing system of another input device (not shown). Similarly, a user's preferred or otherwise associated ink color, pen tip, or other attribute may be determined by the processing system (110) and utilized and/or transmitted to the active pen. Such attributes may also be stored or hardcoded into the active pen.

Figure 5:
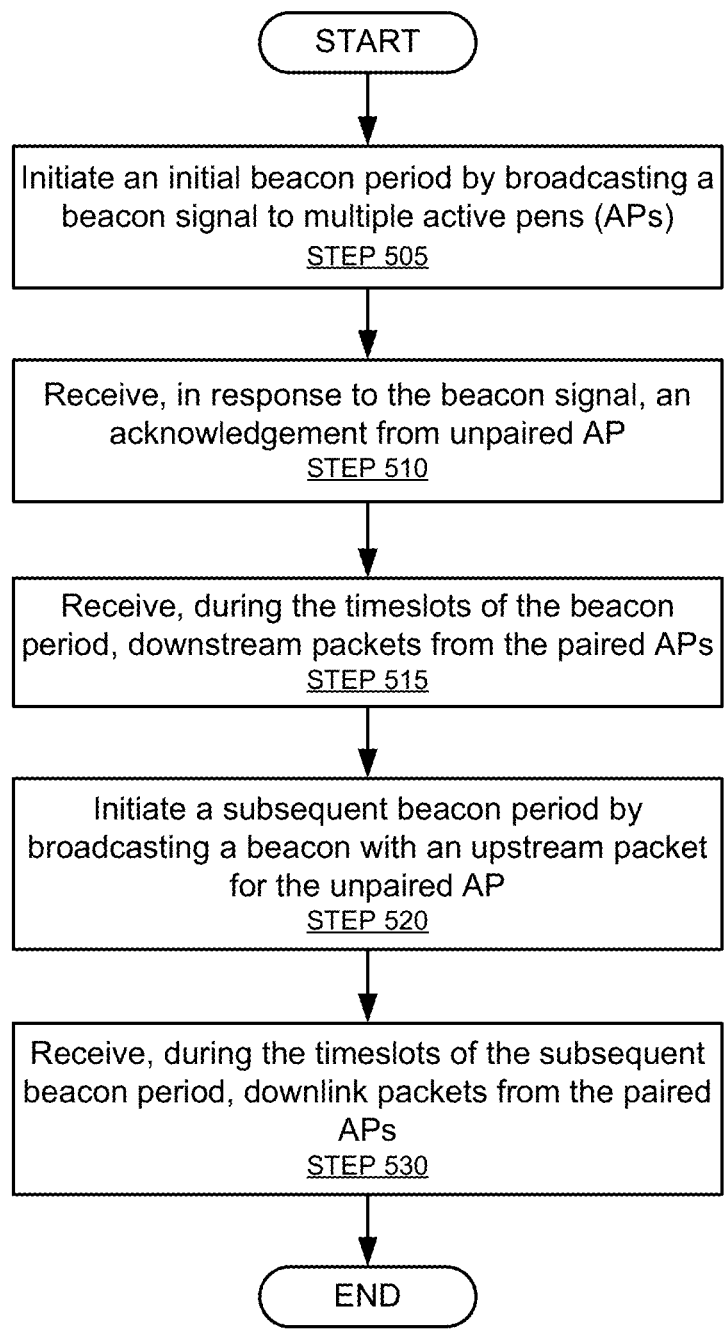
FIGS. 5-7 show flowcharts in accordance with one or more embodiments of the invention.

FIG. 5 shows a flowchart in accordance with one or more embodiments of the invention. The flowchart depicts a process for operating an input device (e.g., input device (100)). Specifically, the depicted process may be used to pair an unpaired active pen to the input device. One or more of the steps in FIG. 5 may be performed by the components of the input system (100), discussed above in reference to FIG. 1. In one or more embodiments of the invention, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5.

Initially, a beacon period is initiated by broadcasting a beacon signal to multiple active pens (APs) (STEP 505). The beacon signal may be broadcasted by a sensor module of the processing system. The beacon signal is received by both paired APs and unpaired APs within a range of the processing system. The beacon signal provides a timing reference to all APs. A predetermined number of timeslots (e.g., 16, 32, 64, etc.) follow the beacon signal and are referenced from the end of the beacon signal.

In STEP 510, an ACK is received from an unpaired AP. The ACK may be received in the timeslot immediately following the beacon signal. The ACK may be received on a default frequency used by all unpaired APs. Alternatively, the ACK may be received on a frequency that is indicated by the data message sent by the beacon signal to the pen. The unpaired AP may have a pen ID=0. In some embodiments, an AP may both reply to the ACK and transmit during assigned timeslots during the same beacon period.

In STEP 515, downstream packets are received from the paired APs during the timeslots of the beacon period. Each paired AP transmits its downstream packets during its assigned timeslots and at its assigned frequencies. The processing system may determine one or more attributes of each paired AP based on the contents (e.g., fields) of the downstream packets.

In STEP 520, a subsequent beacon period is initiated by broadcasting another beacon signal. This beacon signal may include an upstream packet targeting the unpaired AP that sent the ACK. The upstream packet may specify a new pen ID for the unpaired AP, one or more timeslots, and one or more frequencies for the AP to transmit its downstream packets. The unpaired AP is now a paired AP.

In STEP 530, downstream packets are received from the paired APs, including the newly paired AP, during the assigned timeslots and at the assigned frequencies. Like before, the processing system may determine one or more attributes of each paired AP based on the contends (e.g., fields) of the downstream packets.

Figure 6:
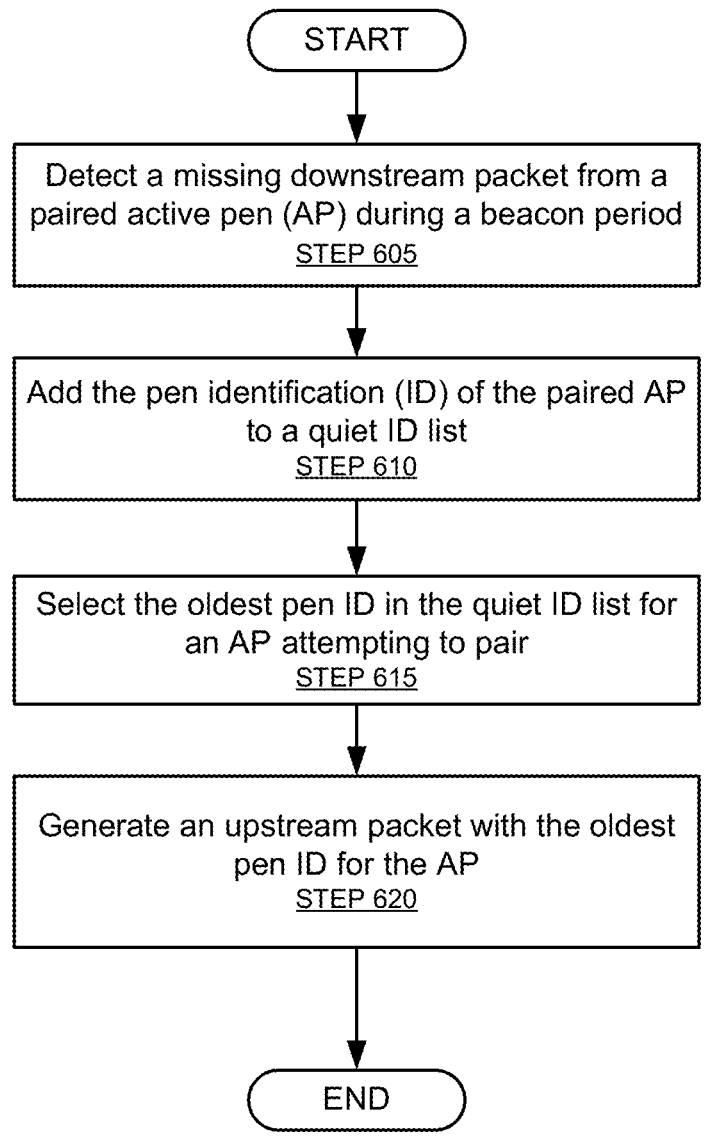

FIG. 6 shows a flowchart in accordance with one or more embodiments of the invention. The flowchart depicts a process for operating an input device (e.g., input device (100)). Specifically, the depicted process may be used to manage pen IDs. One or more of the steps in FIG. 6 may be performed by the components of the input device (100), discussed above in reference to FIG. 1. In one or more embodiments of the invention, one or more of the steps shown in FIG. 6 may be omitted, repeated, and/or performed in a different order than the order shown in FIG. 6. Accordingly, the scope of the invention should not be considered limited to the specific arrangement of steps shown in FIG. 6. Further, the process depicted in FIG. 6 may be executed before, during, or after the process depicted in FIG. 5.

Initially, one or more missing downstream packets from a paired AP are detected (STEP 605). As discussed above, each paired AP is assigned timeslots and frequencies for transmission of its downstream packets. Accordingly, if packets do not arrive from a paired AP during one or more expected timeslot, it is possible the paired AP has been relocated outside the transmission range of the input device.

In STEP 610, the pen ID of the paired AP is added to a quiet ID list. The quiet ID list records previously paired APs from whom downstream packets are no longer received. The pen IDs are recycled for future pairings.

In STEP 615, the oldest pen ID in the quiet ID list is selected. Specifically, the oldest pen ID is selected by the input device in response to an unpaired AP attempting to pair with the input device. For example, the unpaired AP may send an ACK in response to a beacon signal broadcasted by the input device. Alternatively, a pen ID that is not the oldest pen ID is selected. In one or more embodiments, the selected pen ID is sufficiently old such that there is some confidence that the active pen previously assigned the selected pen ID has left the system (e.g., no longer in range of the processing system (110)).

In STEP 620, an upstream packet is generated. The upstream packet includes the selected pen ID. The upstream packet targets the unpaired AP that is attempting to pair and assigns the unpaired AP the selected pen ID. The upstream packet is transmitted in the subsequent signal beacon. Upon receiving the upstream packet, the unpaired AP effectively becomes a paired AP and can transmit its downstream packets during its assigned timeslots and at its assigned frequencies.

Figure 7:
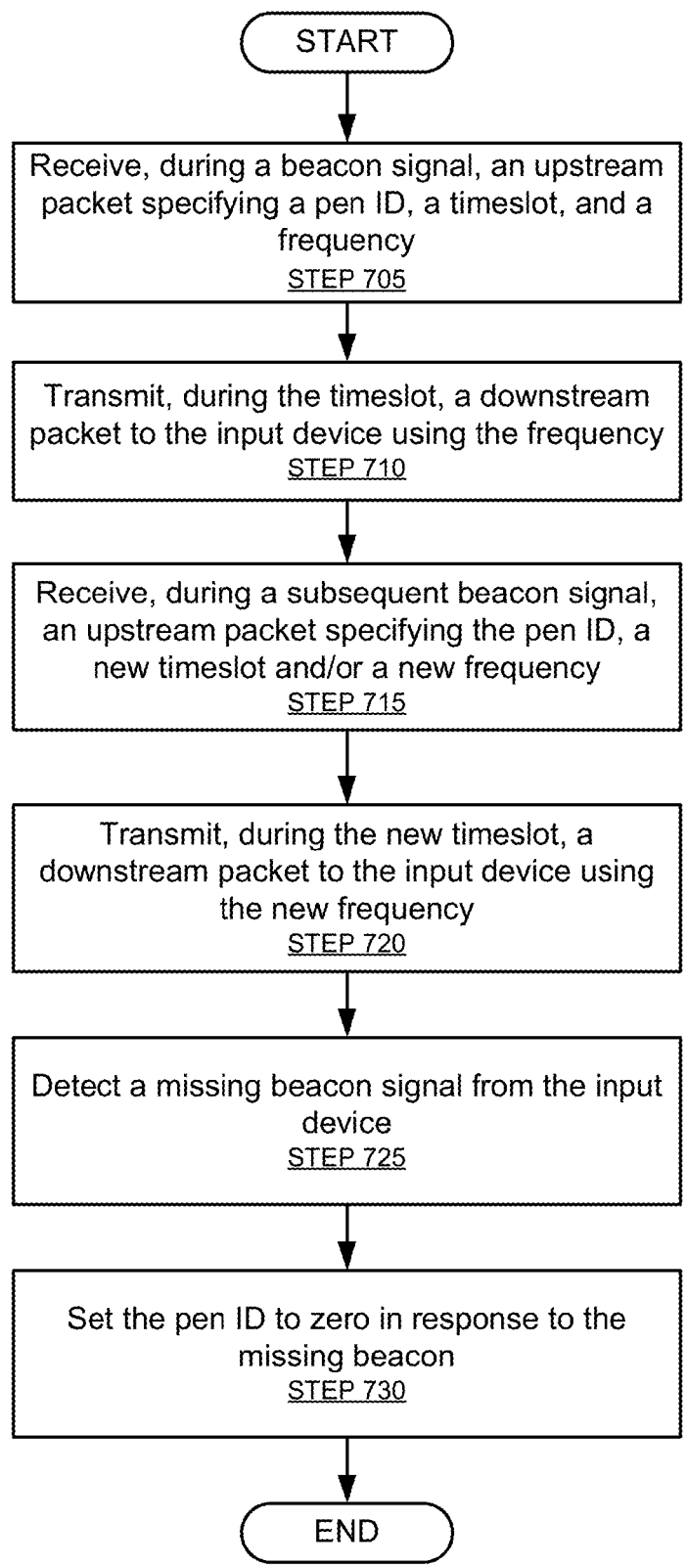

FIG. 7 shows a flowchart in accordance with one or more embodiments of the invention. The flowchart depicts a process for operating an active pen (e.g., active pen (240)). One or more of the steps in FIG. 7 may be performed by the components of the active pen (240), discussed above in reference to FIG. 2. In one or more embodiments of the invention, one or more of the steps shown in FIG. 7 may be omitted, repeated, and/or performed in a different order than the order shown in FIG. 7. Accordingly, the scope of the invention should not be considered limited to the specific arrangement of steps shown in FIG. 7. Further, the process depicted in FIG. 7 may be executed before, during, or after the processes depicted in FIG. 5 and in FIG. 6.

Initially, an upstream packet is received by the active pen (STEP 705). The upstream packet is received during a beacon signal broadcasted by an input device. The upstream packet may assign/specify a pen ID (e.g., pen ID=5), one or more timeslots, and one or more frequencies at which to transmit downstream packets. The active pen is now paired.

In STEP 710, the active pen transmits its downstream packets to the input device during its assigned timeslots and at its assigned frequencies. The downstream packets may be transmitted by one or more transceivers in the active pen. The downstream packets may include one or more attributes of the active pen.

In STEP 715, during a subsequent beacon signal, another upstream packet is received by the active pen. This new upstream packet is targeted for the active pen because the upstream packet specifies the same pen ID (i.e., pen ID=5) as the pen ID assigned to the active pen. The upstream packet also specifies a new timeslot and/or a new frequency. In other words, the input device is attempting to reconfigure the active pen. The reconfiguration may be in response to detected noise and an attempt to mitigate the noise.

In STEP 720, the reconfigured active pen now transmits its downstream packets during the newly assigned timeslots and/or at the newly assigned carrier signal frequency.

In STEP 725, the active pen no longer receives the beacon signal. In other words, the active pen detects one or more missing beacon signals. For example, the active pen may be relocated outside the range of the input device.

In STEP 730, after detecting one or more missing beacon signals, the active pen may un-pair itself by setting its pen ID to zero. In one or more embodiments, the active pen may un-pair itself only after a threshold number/count (e.g., 5, 7, 12, etc.) of beacon signals are missed.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for an input device, the processing system comprising:
    a sensor module coupled to sensor circuitry and configured to:
        initiate a current beacon period comprising a plurality of timeslots by broadcasting, to a plurality of active pens comprising a first active pen, a current beacon signal comprising an upstream packet for the first active pen and specifying a pen identification (ID) associated with the first active pen;
        receive, during a first timeslot, a first downstream packet from a first active pen transceiver of the first active pen; and
        receive, during a second timeslot, a second downstream packet from a second active pen transceiver; and
    a determination module configured to:
        generate the upstream packet for the first active pen specifying the pen ID; and
        determine an attribute of the first active pen comprising the first active pen transceiver from at least the first downstream packet.

2. The processing system of claim 1, wherein the first active pen further comprises the second active pen transceiver, and wherein the attribute of the first active pen is further determined from the second downstream packet.

3. The processing system of claim 1, wherein the attribute is at least one selected from a group consisting of pen tilt, color, and erasure mode.

4. The processing system of claim 1, wherein the determination module is further configured to:
    determine an attribute of a second active pen comprising the second active pen transceiver from the second downstream packet.

5. The processing system of claim 4, wherein the determination module is further configured to:
    detect a missing downstream packet from the second active pen during a subsequent beacon period; and
    add a pen ID for the second pen to a quiet ID data structure after detecting the missing downstream packet.

6. The processing system of claim 4, wherein the determination module is further configured to:
    detect a collision between the first active pen and the second active pen; and
    generate a collision packet for the first active pen and the second active pen,
    wherein the sensor module is further configured to send the collision packet, and
    wherein each of the first active pen and the second active pen wait a random time interval before reattempting to pair in response to the collision packet.

7. The processing system of claim 1, wherein the attribute of the first active pen is at least one selected from a group consisting of a force measurement at a tip of the first active pen and a button status of a button on the first active pen.

8. The processing system of claim 1, wherein the determination module is further configured to:
    obtain a user ID for a user of the first active pen in response to the user logging into an application,
    wherein the upstream packet comprises the user ID; and
    wherein the first active pen transmits the user ID in subsequent pairings.

9. The processing system of claim 1, wherein the first downstream packet is transmitted using a first frequency and the second downstream packet is transmitted using a second frequency.

10. The processing system of claim 9, wherein:
    the sensor module is further configured to:
        initiate a prior beacon period by broadcasting a prior beacon; and
        receive, during a timeslot of the prior beacon period, an acknowledgement from the first active pen in response to the prior beacon,
    wherein the first active pen is unpaired during a portion of the prior beacon period,
    wherein the upstream packet is generated in response to the acknowledgement, and
    wherein the upstream packet further specifies the first timeslot and the first frequency.

11. The processing system of claim 1, wherein the sensor module is further configured to:
    transmit firmware data to the first active pen over a plurality of timeslots during a subsequent beacon period, the first active pen configured to update pen firmware based on the firmware data.

12. A method for operating a processing system of an input device, comprising:
    generating an upstream packet for a first active pen specifying a pen identification (ID) associated with the first active pen;
    initiating a current beacon period comprising a plurality of timeslots by broadcasting, to a plurality of active pens comprising the first active pen, a current beacon signal comprising the upstream packet;
    receiving, during a first timeslot, a first downstream packet from a first active pen transceiver over a first frequency;
    receiving, during a second timeslot, a second downstream packet from a second active pen transceiver over a second frequency; and
    determining an attribute of the first active pen comprising the first active pen transceiver from at least the first downstream packet.

13. The method of claim 12, wherein the first active pen further comprises the second active pen transceiver, and wherein the attribute of the first active pen is further determined from the second downstream packet.

14. The method of claim 12, further comprising:
    determining an attribute of a second active pen comprising the second active pen transceiver from the second downstream packet.

15. The method of claim 14, further comprising:
detecting a missing downstream packet from the second active pen during a subsequent beacon period; and
adding a pen ID for the second pen to a quiet ID data structure after detecting the missing downstream packet.

16. The method claim 14, further comprising:
detecting a collision between the first active pen and the second active pen; and
sending a collision packet for the first active pen and the second active pen,
wherein each of the first active pen and the second active pen wait a random time interval before reattempting to pair in response to the collision packet.

17. The method of claim 12, wherein the attribute of the first active pen is at least one selected from a group consisting of a force measurement at a tip of the first active pen and a button status of a button on the first active pen.

18. The method of claim 12, further comprising:
obtaining a user ID for a user of the first active pen in response to the user logging into an application,
wherein the upstream packet comprises the user ID; and
wherein the first active pen transmits the user ID in subsequent pairings.

19. The method of claim 12, further comprising:
initiating, before initiating the current beacon period, a prior beacon period by broadcasting a prior beacon signal;
receiving, during a timeslot of the prior beacon period, an acknowledgement from the first active pen in response to the prior beacon,
wherein the first active pen is unpaired during at least a portion of the prior beacon period,
wherein the upstream packet is generated in response to the acknowledgment, and
wherein the upstream packet further specifies the first timeslot and the first frequency.

20. An active pen, comprising:
an identification (ID) register storing a pen identification (ID);
a button; and
a transceiver configured to:
receive, from a first input device, a current beacon signal comprising an upstream packet specifying the pen ID, a timeslot, and a frequency,
wherein the current beacon signal initiates a current beacon period comprising a plurality of timeslots; and
transmit, to the first input device and during the timeslot specified in the upstream packet, a downstream packet comprising a status of the button using the frequency specified in the upstream packet.

21. The active pen of claim 20, wherein the transceiver is further configured to:
receive, before receiving the current beacon signal, a prior beacon from the first input device,
wherein the prior beacon signal initiates a prior beacon period, and
wherein the active pen is unpaired for at least a portion of the prior beacon period; and
send, in response to the prior beacon, an acknowledgment to trigger pairing with the first input device.

22. The active pen of claim 21, wherein the transceiver is further configured to:
receive, from the first input device, a collision packet;
wait a random time interval in response to the collision packet; and
re-attempt pairing with the first input device after the random time interval.

23. The active pen, of claim 21, further comprising:
a determination module configured to:
detect a missing beacon from the first input device; and
set the ID register to zero in response to the missing beacon to unpair the active pen.

24. The active pen of claim 20, wherein the transceiver is further configured to:
receive, from the first input device, a user ID of a user;
send the user ID to a second input device during a pairing of the second input device.

* * * * *